April 11, 1961 M. W. BANG 2,979,615

APPARATUS FOR TUNING A RADIO FREQUENCY

Filed Nov. 6, 1956 7 Sheets-Sheet 1

INVENTOR.
Mogens W. Bang
BY Watts, Mackey & Burden
HIS ATTORNEYS

April 11, 1961 M. W. BANG 2,979,615

APPARATUS FOR TUNING A RADIO FREQUENCY

Filed Nov. 6, 1956 7 Sheets-Sheet 2

INVENTOR.
*Mogens W. Bang*

BY *Webb Mackey & Burden*
*HIS ATTORNEYS*

INVENTOR.
Mogens W. Bang
BY
Webb Mackey & Burden
HIS ATTORNEYS

APPARATUS FOR TUNING A RADIO FREQUENCY

Filed Nov. 6, 1956 7 Sheets-Sheet 4

INVENTOR.
Mogens W. Bang
BY Watt Mackey & Burden
HIS ATTORNEYS

April 11, 1961 M. W. BANG 2,979,615

APPARATUS FOR TUNING A RADIO FREQUENCY

Filed Nov. 6, 1956 7 Sheets-Sheet 5

INVENTOR.
Mogens W. Bang

BY
Webb Mackey & Burden
HIS ATTORNEYS

INVENTOR.
Mogens W. Bang
BY
Webb Mackey & Burden
HIS ATTORNEYS

INVENTOR.
Mogens W. Bang
BY
Wolf Mackey & Burden
HIS ATTORNEYS

United States Patent Office 2,979,615

Patented Apr. 11, 1961

2,979,615

APPARATUS FOR TUNING A RADIO FREQUENCY

Mogens W. Bang, Hubbard, Ohio, assignor to Liberty Manufacturing Corporation, Youngstown, Ohio, a corporation of Ohio Filed Nov. 6, 1956, Ser. No. 620,741

5 Claims. (Cl. 250—40)

This application relates to method and apparatus for tuning a radio frequency. More particularly, it relates to method and apparatus for tuning a wide range of frequencies in which components for varying the frequency of electronic equipment are connected into the main tuning circuitry of the equipment in sets so that the frequency of the tuner and, therefore, of the equipment is changed by steps rather than continuously. My inventions have a number of applications in electronic equipment, for example, measuring equipment, multiple frequency range radio transmitters and receivers, tuners for television receivers, etc. My inventions are particularly useful in tuners for television receivers and, therefore, they will be described with reference thereto.

My inventions are useful in television receivers designed for very high frequencies, receivers designed for ultrahigh frequencies, and receivers designed for both very high and ultrahigh frequencies. They are particularly useful in the last mentioned type of receiver because, as will be later explained, they make it possible for such a receiver to receive by step tuning not only all of the presently used very high frequency channels but also all of the ultrahigh frequency channels. At the same time, a tuner embodying my inventions requires less space than is now required by conventional step tuners in television receivers.

In television receivers for very high frequencies employing so-called step tuning, groups of components, such as capacitors and inductances, are connected into the main circuitry of the tuner, one group at a time, to adjust the tuner to different frequencies. Each group is mounted on a strip of dielectric material, the assembly being known as a "tuner strip" or "tuning strip." The tuner strips have contacts which engage fixed contacts connected into the main circuitry of the tuner. The strips are moved so that the contacts on the strips engage the fixed contacts one strip at a time. As each strip is thereby connected into the main circuitry of the tuner, the frequency of the tuner is changed in steps.

Due to various factors, such as atmospheric conditions, age of components, etc., when a tuner is adjusted to a particular frequency by connecting a tuner strip into the main tuner circuitry, the tuner is not necessarily adjusted to the exact frequency desired. To compensate for the maladjustment, tuners heretofore used have included a trimmer in the main tuner circuitry which is adjusted by a separate control mechanism and knob to "fine tune" the main tuner circuitry in order to receive the desired frequency. Whenever the tuner is switched to a different frequency by connecting a different tuner strip into the main tuner circuitry, the tuner may again be out of correct adjustment because the adjustment of the trimmer which was made for the first frequency is not correct for the second frequency. If this occurs, then it is again necessary to "fine tune" the tuner for the second frequency. If now the tuner is switched back to the first frequency, then the trimmer must again be adjusted for the first frequency. My inventions eliminate the necessity of "fine tuning" each time the tuner is switched to a different frequency or channel by avoiding adjustments to the main tuner circuitry. In accordance with my inventions, whenever a channel is once selected and "fine tuned," the fine tuning adjustment for that channel will hold even though the tuner is switched to other channels and then brought back to the first channel or frequency selected.

In addition to the 12 very high frequency channels now in use, there are also available 70 ultrahigh frequency channels, certain channels only, however, being assigned to particular localities. The large number of ultrahigh frequency channels creates a special problem in the design of step tuners for ultrahigh frequency receivers. If present designs of step tuners are employed, it is not possible to install 70 groups of components or "tuner strips," as they are called, one for each channel. A tuner having such a large number of strips would be impossibly large. The result is that television receiver manufacturers have resorted either to continuous tuning, which is very difficult for the average television viewer to carry out because it requires trial and error methods to tune to a desired frequency, or they have provided in a step tuner for a limited number of fixed ultrahigh frequency positions and have thus allowed for only a limited number of ultrahigh frequency channels which the receiver can tune to. Receiver manufacturers favoring the latter approach have, therefore, been compelled to send out television receivers having ultrahigh frequency tuner strips which vary with the locality to which the receivers are shipped. This creates a distribution problem. An alternative course has been to send out the receivers without tuner strips and to supply local dealers with strips appropriate for the area in which the dealers are located. The dealers then adds the correct strips to the sets which he sells. This adds to the cost of the receiver. Moreover, whenever the owner of a television receiver moves from one locality to another, it is necessary to have a serviceman change the strips in the tuner of the set. This calls for an expensive and, therefore, objectionable service call.

My inventions provide for ultrahigh frequency tuning strips, each of which carries components which can be adjusted to a range of frequencies by the operator. Stated differently, in accordance with my inventions, one tuning strip can be used to adjust the tuner to many frequencies. The result is that an operator in any locality, who uses a tuner having only a few of these multiple frequency strips and the control mechanism therefor, can locate the few ultrahigh frequency channels receivable in his locality, using one strip for each channel, and can thereafter step-tune those channels, inasmuch as each strip then represents a pre-tuned channel in the ultrahigh frequency range which is receivable in his locality.

My inventions provide for a single control mechanism which is used by the tuner operator to reach each of the multiple frequency strips through the tuner housing whenever it is desirable to change the particular channel being received on the strip and also to reach the very high frequency strips for fine tuning purposes. In reaching and adjusting either type of strip, the operation of this single control mechanism remains the same.

In the accompanying drawings, I have illustrated certain presently preferred embodiments of my inventions, in which.

Figure 4:
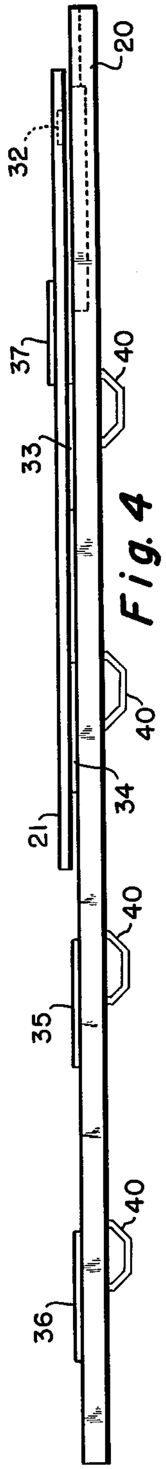
Figure 5:
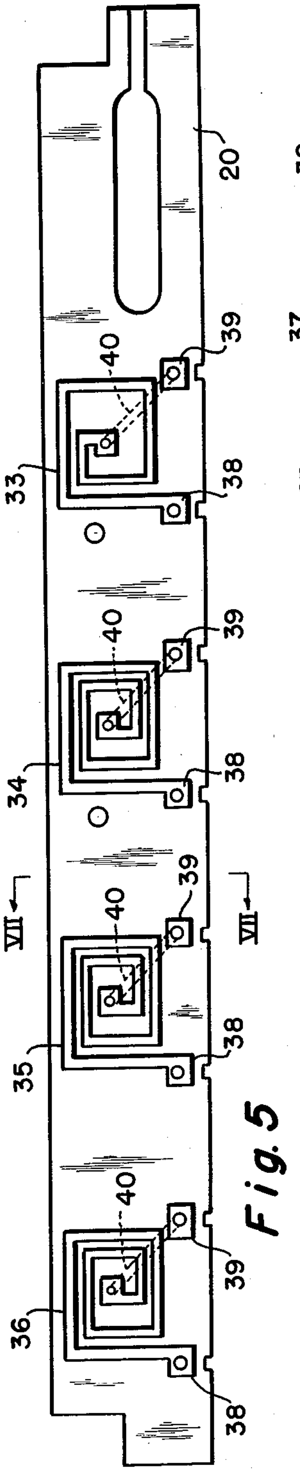
Figure 6:
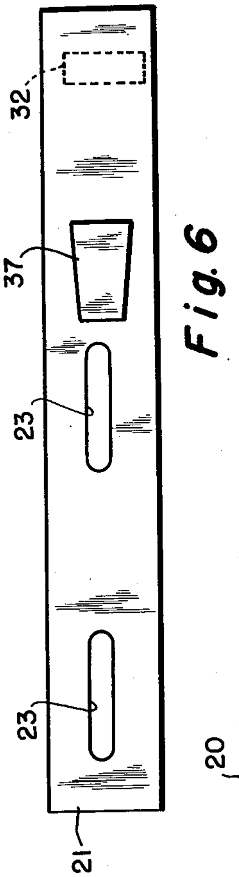
Figure 7:
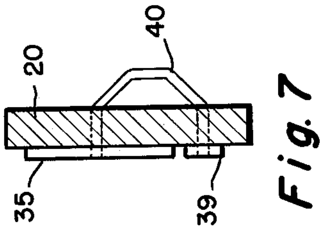
Figure 8:
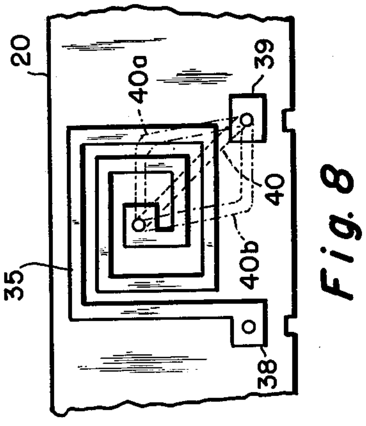
Figure 9:
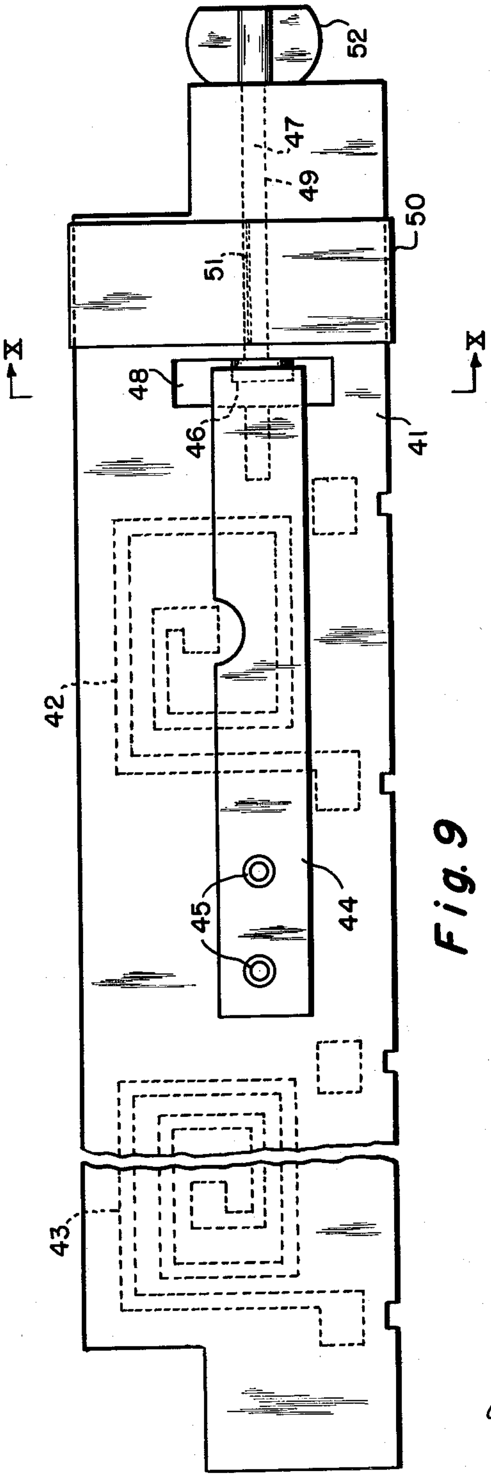
Figure 10:
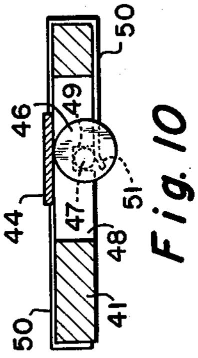
Figure 11:
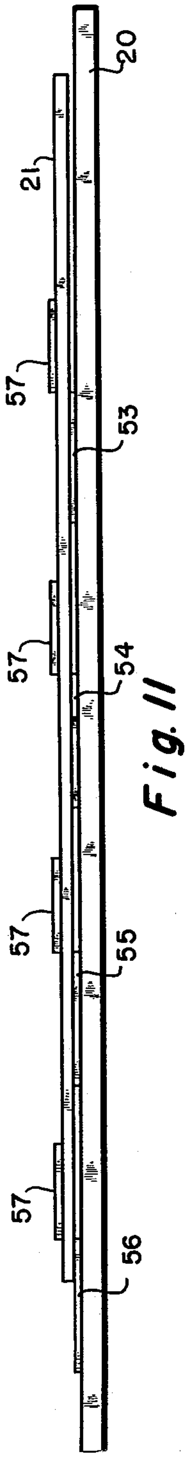
Figure 12:
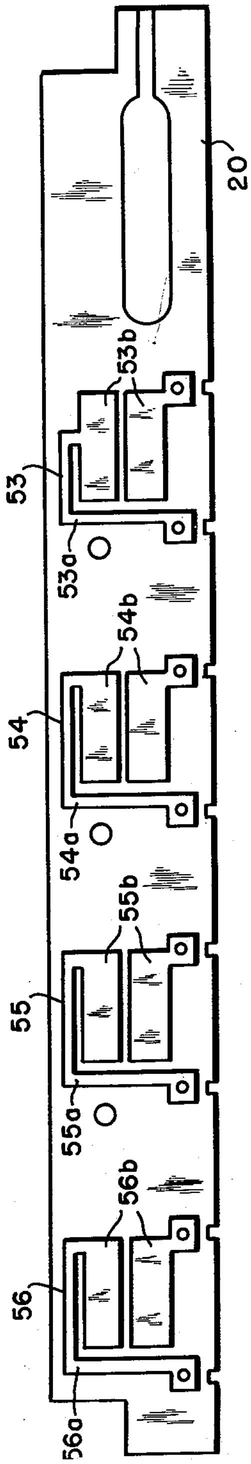
Figure 13:
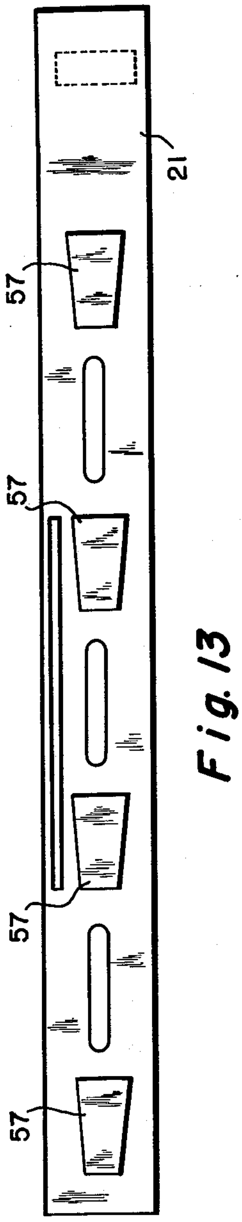
Figure 14:
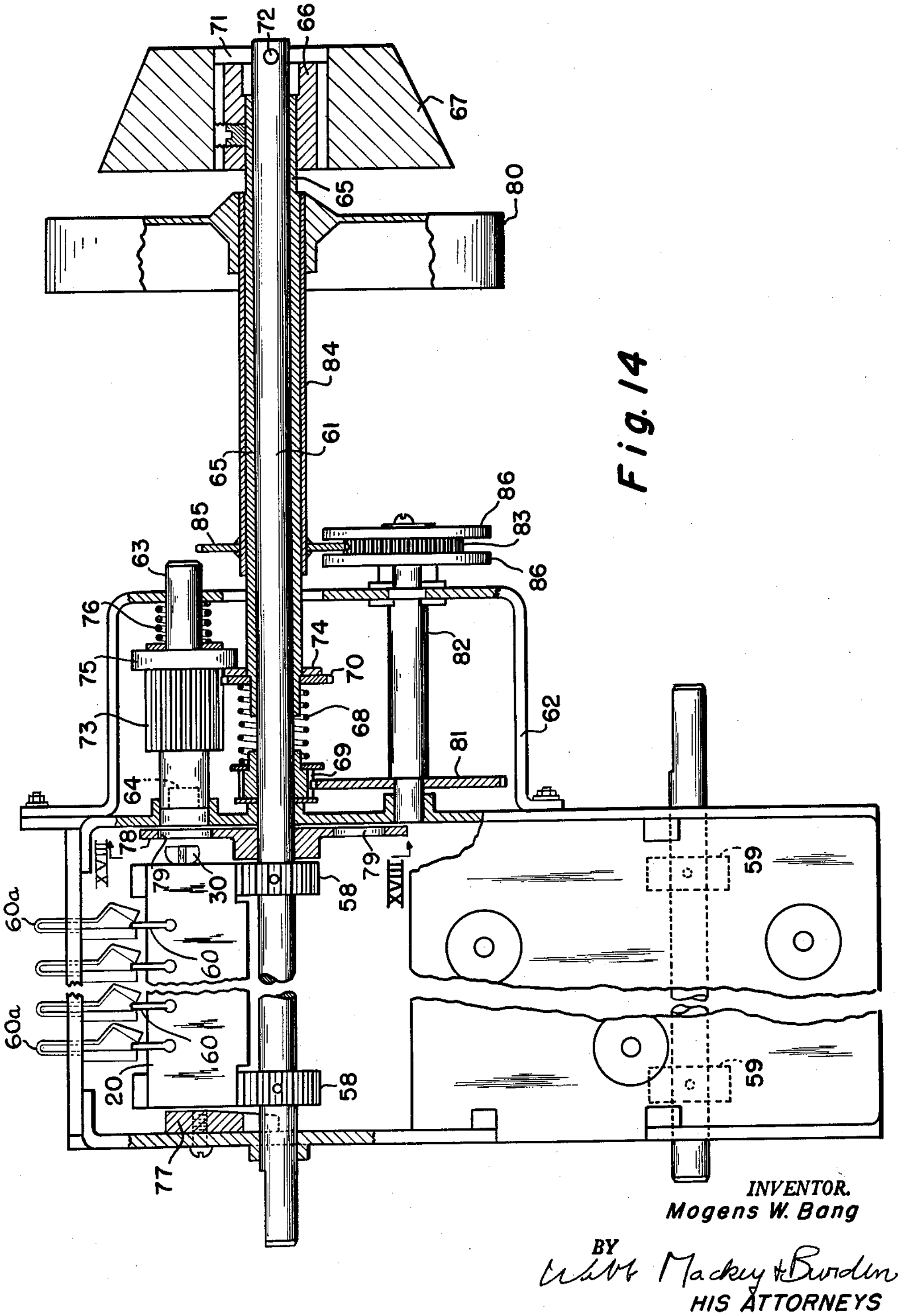
Figure 15:
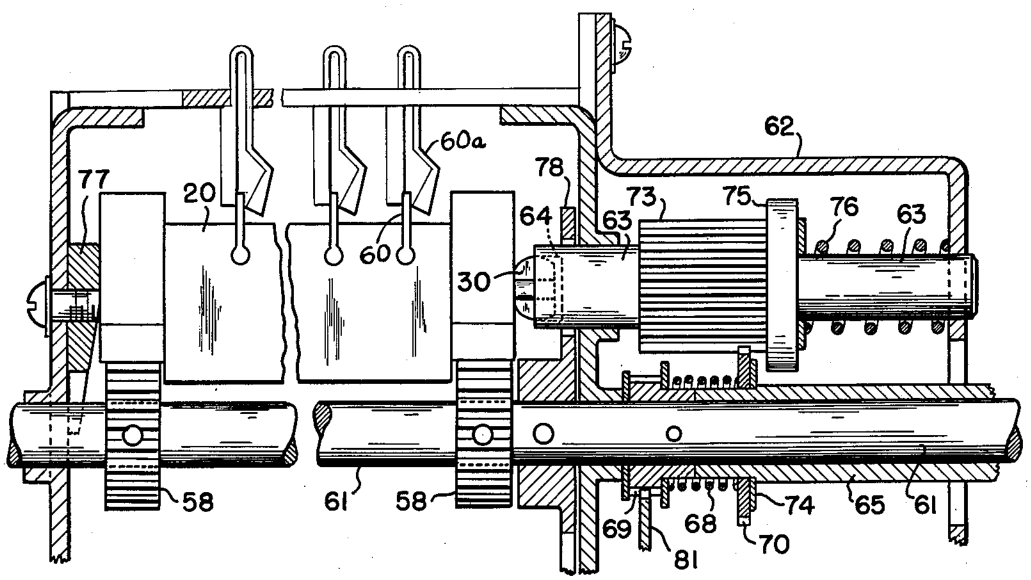
Figure 16:
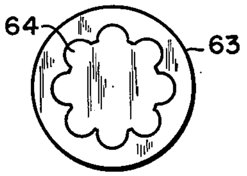
Figure 17:
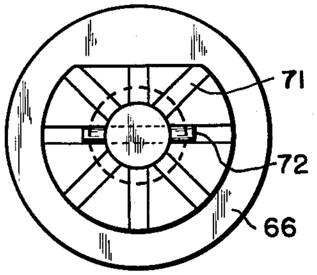
Figures 18, 19:
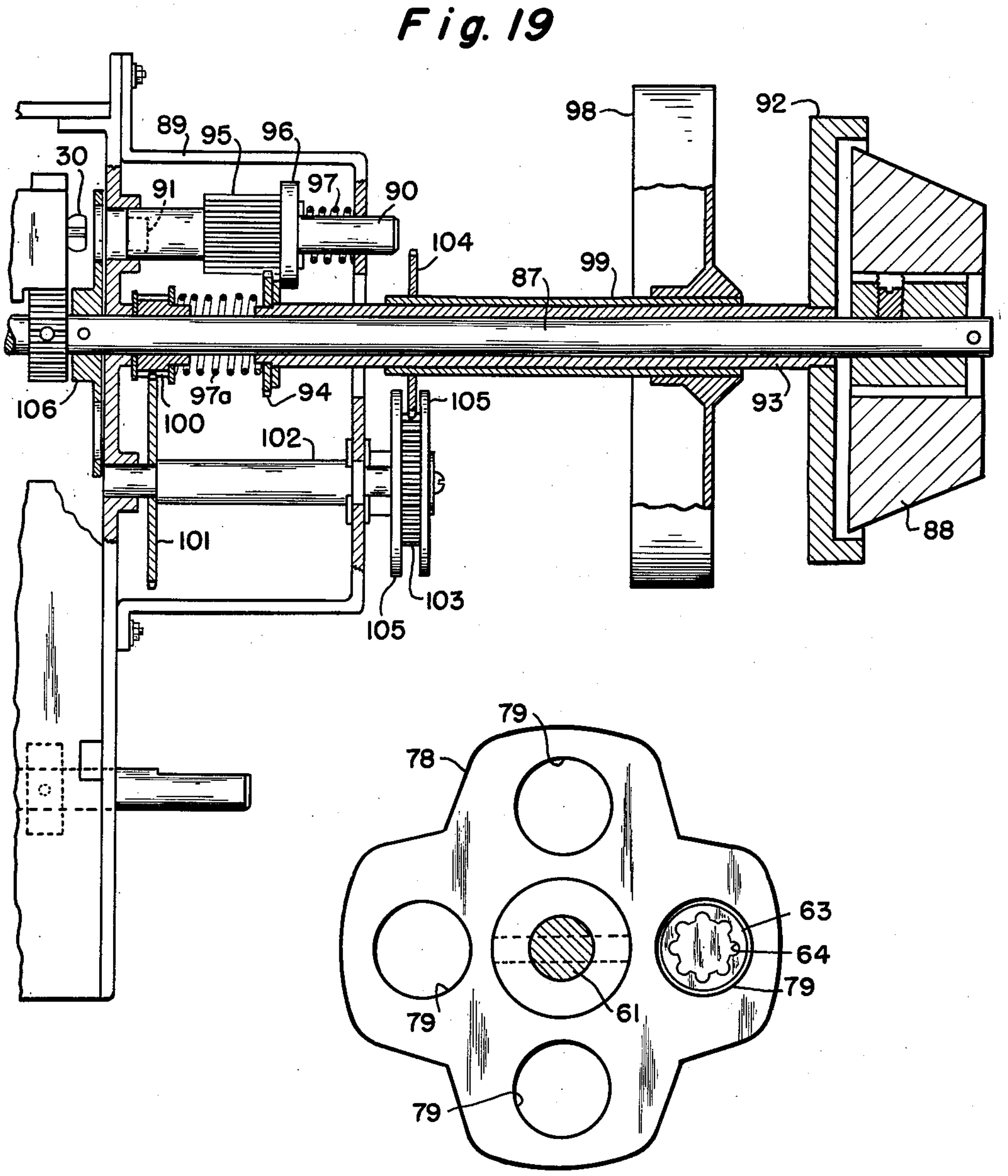

Figures 4, 5, and 6 are diagrammatic showings of circuits carried on my tuning strip for tuning to very high frequencies;

Figure 7 is a section along the lines VII—VII of Figure 5;

Figure 8 is a fragmentary view showing a portion of the tuning strip shown in Figure 5;

Figure 9 is a plan view of a modified form of tuning strip;

Figure 10 is a section along the lines X—X of Figure 9;

Figures 11, 12, and 13 are diagrammatic showings of circuits carried on my tuning strip for tuning to ultrahigh frequencies;

Figure 14 is a vertical longitudinal section with portions broken away of one form of tuner adjustment mechanism;

Figure 15 shows a portion of Figure 14 on an enlarged scale;

Figure 16 is an end view of a socket employed in the tuning mechanism shown in Figure 14;

Figure 17 is an end view of a tuning knob core used in the mechanism shown in Figure 14;

Figure 18 is a section along the lines XVIII—XVIII of Figure 14; and

Figure 19 is a longitudinal vertical section of a modified form of my tuner adjustment mechanism.

In a tuner embodying my inventions, there are a plurality of tuner strips, each of which carries a plurality of components which are connected into the main circuitry, one strip at a time, to adjust the tuner to various frequencies. The strips each carry contacts connected to the components on the strips and these strips are moved in the tuner so that the contacts on the strips engage fixed contacts connected into the main tuner circuitry. My tuner strips can be used in any tuner employing such strips. However, I prefer to use a multiple position switch such as is described and claimed in my U.S. Patent No. 2,813,935. In this switch, the individual strips are mounted on two continuous flexible belts, each of which moves over two sprockets spaced from each other with one sprocket vertically above the other. The contacts on the strips engage fixed contacts directly above the center line of the upper sprocket so that there is adequate space for adjusting one or more of the components on the strip.

Figure 1:
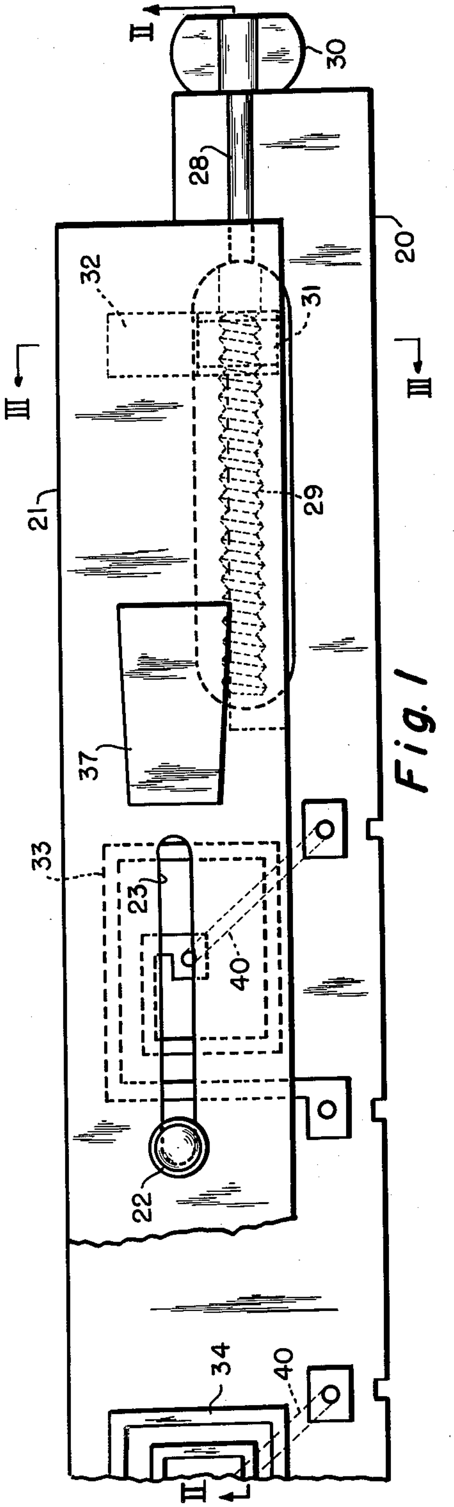
Figure 1 is a partial plan view of a tuning strip which I have invented.
Figure 2:
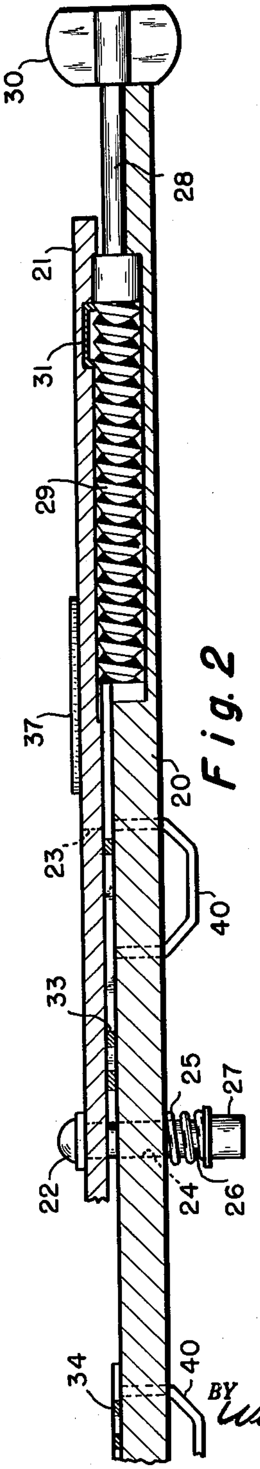
Figure 2 is a section along the lines II—II of Figure 1.
Figure 3:
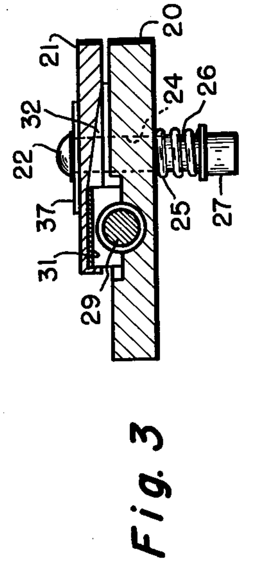
Figure 3 is a section along the lines III—III of Figure 1.

Referring to Figures 1 to 3, inclusive, a tuner strip embodying my invention comprises two elongated strips 20 and 21 of dielectric material. As will be later described, one of these strips carries "printed circuits" on one or both sides and the other strip carries one or more shields for adjusting the circuits carried on the first strip. Preferably, these shields are also formed by printing.

The two strips 20 and 21 are held against each other side by side and may be slid lengthwise of each other. The strips are held by pins 22 spaced along their lengths. The pins pass through slots 23 in the strip 21 which carries the shields and holes 24 in the strip 20 which carries the printed circuitry. The pins 22 extend beyond the surface of the strip 20 away from the strip 21 and carry compression springs 25 which press against the surface of the strip 20 and against a washer 26 held on the end of the pin 22 by flattening the end 27 of the pin. The springs 25 thus press the two strips 20 and 21 against each other with a slight pressure and, by reason of the slots 23, the strips can move relative to each other lengthwise over a limited distance.

In a tuner embodying my inventions, the dielectric strip 20 is fixedly secured to the mechanism for switching the tuner strips in the tuner and the dielectric strips 21 are moved relative to the tuner strip 20. In order to adjustably move the strips 21, I provide a shaft 28 rotatably mounted in the strip 20 and having at one end an enlarged threaded portion 29 and at the other end a serrated head 30 which can be engaged and turned by mechanism to be later described. A nut 31 mounted in a transverse slot 32 in the strip 21 engages the threaded portion 29 of the shaft 28. Rotation of the shaft 28 thereby causes the strip 21 to move relative to the strip 20.

Referring to Figure 2, it will be seen that the strips 20 and 21 are mounted relative to each other so that printed circuits are on the surface of the strip 20 which is between the two strips 20 and 21, one such circuit being shown at 33 in Figure 2. The outer surface of the strip 21, i.e., the surface away from the strip 20, carries shields for the components which are printed on the inside surface of the strip 20, one such shield being shown as 37 in Figure 2.

Figures 4 to 6, inclusive, illustrate diagrammatically the arrangement of the printed circuits and of the shield for a tuner strip designed to receive a very high frequency channel. On one surface of the strip 20, there are printed a series of inductances or capacitors, depending on the circuitry, 33, 34, 35, and 36, which are spaced along the length of the surface of the strip and insulated from each other by reason of the fact that the strip 20 is made of dielectric material. In the strip shown in Figures 4 to 6, inclusive, the coil 36 is connected to the antenna circuit, the coil 35 is in the plate circuit of the RF amplifier, the circuit coil 34 is in the mixer circuit, and the coil 33 is in the oscillating circuit of the main tuner circuitry.

In order to "fine tune" to a very high frequency broadcast, it is necessary to adjust only the oscillator circuit and, therefore, as shown in Figures 4 and 6, I provide only one shield 37, which is preferably "printed" on the strip 21. Referring to Figure 4, it will be seen that the shield 37 is spaced on the strip 21 relative to the oscillator coil 33 which is printed on the strip 20 so that the shield and the coil are in electrical relationship with each other. As the strip 21 is moved lengthwise relative to the strip 20, the shield 37 will vary the electrical value of the coil 33 and thereby the oscillator circuit can be adjusted.

Referring to Figure 6, the shield 37 is a plate of electrically conductive material, generally rectangular in area, having its longest dimension parallel to the length of the strip 21. It will also be noted that the dimension of the shield 37 which is at right angles to the direction of movement of the strip varies along the length of the shield so that the desired adjustment of the coil 33 can be obtained. As is well known, the shape of the shield can be designed to fit any ratio between frequency change and shield movement desired.

As shown in Figures 4 and 5, the inductances 33 to 36, inclusive, are in the form of flat coils of electrically conducting material, one end of each coil being positioned inside the coil. Preferably the coils are "printed" on the strip 20. The strip 20 also carries terminals 38 and 39 for each coil, the terminals 38 being formed integrally with the outer ends of the conductors forming the coils. The inner ends of each of the coils are connected to the terminals 39 by conductors 40. Referring to Figures 2, 4, and particularly Figure 7, it will be seen that the conductors 40 are on the side of the strip 20 opposite to that on which the coils are mounted. It will also be seen that the conductors 40 form a loop between the point of connection with the inner ends of the coil and the terminals 39. While the conductors 40 are thus spaced from the coils 35, they remain in electrical relationship with the coils so that the conductors 40 can be bent to vary the electrical value of the inductance or coil. Thus, if the conductor 40 is bent to the position shown in dotted lines at 40$a$ in Figure 8, the value of the inductance is increased. If the conductor 40 is bent to the position shown in dotted liens at 40$b$ in Figure 8, the value of the inductance 35 is decreased. By thus looping position shown in dotted lines at 40$b$ in Figure 8, the the conductors 40, I provide a means for "factory adjusting" the coils on the tuner strips to correct for any inaccuracies which may have developed during their manufacture prior to the assembly of a tuner embodying these coils.

Figures 9 and 10 show a modified form of tuner strip which may be used for fine tuning a very high frequency in the same tuner switching mechanism described above. This tuner strip comprises a single layer of dielectric material 41 on one side of which components 42 and 43 are mounted in the same manner as the components 33 to 36 of the form of tuner strip shown in Figures 4 to 8, inclusive. On the opposite side of the strip 41 and in electrical relationship with the coil 42 which is connected into the oscillator circuit of a tuner, I secure a plate 44 of electrically conductive material. This plate 44 has sufficient resilience that, when held at one of its ends to the strip 41 by rivets 45, it will lie substantially flush with the side of the strip 41 to which it is secured. As shown in Figure 9, the plate 44 extends across the coil 42. They are on opposite sides of the strip 41 but they are in electrical relationship with each other so that, if the free end of the plate 44 is moved toward and away from the surface of the strip 41, the electrical value of the coil 42 will be changed. To move the plate 44 toward and away from the strip 41, I provide a cam disc 46 eccentrically mounted on one end of a shaft 47. The disc 46 is positioned in a transverse slot 48 cut in the strip 41 so that when the shaft 47 is turned to one angular position the disc 46 permits the free end of the plate 44 to lie substantially flush with the side of the strip 41. When the shaft is turned, the cam disc 46 moves the free end of the plate 44 away from the surface of the strip 41.

The shaft 47 lies in the groove 49 which extends longitudinally of the strip between the slot 48 and the end of the strip and is held in the groove by a spring clip 50 which extends substantially around the strip 41 and has one end 51 which presses against the shaft 47. The other end of the shaft 47 carries a serrated head 52 similar to the head 30.

Figures 11, 12, and 13 show diagrammatically a tuning strip for tuning an ultrahigh frequency broadcast. The dielectric strip 20 carries four circuits 53, 54, 55, and 56, which correspond in position and function to the circuits 33 to 36, inclusive, of Figure 5. That is, circuit 56 is in the antenna circuit, circuit 55 is in the plate circuit of the RF amplifier, circuit 54 is in the mixer circuit, and circuit 53 is in the oscillator circuit of the main tuner circuitry.

In each of these circuits 53 to 56, inclusive, the leg portions **53*a*, 54*a*, 55*a*, and 56*a* constitute inductances and the plates 53*b*, 54*b*, 55*b*, and 56*b*** constitute capacitors.

As is later explained, the tuner strips which I employ for tuning ultrahigh frequencies are designed to tune a desired frequency within a certain range or band of frequencies. In this operation, all of the components on a strip are "gang tuned"; that is, they are all adjusted simultaneously. The mechanism which I have designed for this gang tuning is also used for fine tuning the desired frequency. Fine tuning is thus accomplished automatically and simultaneously with the locating of the desired frequency on the strip.

Figures 11 to 13 show a tuner strip for a range of ultrahigh frequencies in which all of the components on the strip can be adjusted simultaneously. I provide on the strip 21 a shield 57 in the form of a plate of electrically conductive material for each of the components on the strip. Referring to Figure 11, it will be seen that one of the shields 57 is positioned relative to one of the components 53 to 56, inclusive, so that it is in electrical relationship therewith. Movement of the strip 21 relative to the strip 20 and, therefore, movement of the shields 57 toward and away from the components on the strip 20 will affect the electrical value of those components.

A tuner strip for very high frequencies could be "gang tuned" in the same manner as has just been described for an ultrahigh frequency strip. This could be done to reduce the number of strips used in a tuner for tuning very high frequencies. Such a very high frequency strip would have a component arrangement such as is shown in Figure 5 and a strip having a shield for each component similar to the strip shown in Figure 13.

I have also invented mechanism for selecting a tuner strip and then adjusting one or more components on the selected strip. In Figure 14, I have shown this mechanism installed on a multiple position switch such as is shown in U.S. Patent No. 2,813,935. It may be used in other multiple position switches in which tuner strips are moved one at a time into contact with fixed contacts connected into the main tuner circuitry and in which there is room to adjust the individual tuner strips, as has been described above.

In a multiple position switch, such as is shown in my said copending application, individual tuner strips (only one of which is shown in Figure 14) are mounted on endless belts (not shown in Figure 14) which move about sprocket wheels 58 and 59. When the tuner strips are brought to the position of the one strip shown in Figure 14, contacts 60 on the strip engage fixed contacts **60*a* which are connected into the main tuner circuitry. A shaft 61 mounted in the casing of the switch supports the sprockets 58** and rotation of this shaft brings the tuning strips one at a time into the position occupied by the one tuner strip in Figure 14.

My adjusting mechanism has a casing 62 which is secured to the side of the casing of the multiple position switch. The shaft 61 passes through this casing and the casing supports a second shaft 63, mounted parallel to the shaft 61. The shaft 63 has a socket 64 which, when the shaft 63 is moved axially, will engage the head 30 or 52 on a tuning strip.

At its outer end away from the switch, the shaft 61 carries a sleeve 65 which is concentrically mounted on the shaft. This sleeve 65 carries a hub 66 for a hand knob 67 which may be turned to rotate both the shaft 61 and the sleeve 65, or it may be used to rotate the sleeve 65 only. Within the casing 62 and concentric with the shaft 61, I provide a compression spring 68 which presses against a gear 69 also mounted on the shaft 61 and against a gear 70 mounted on the end of the sleeve 65 which is within the casing 62. The spring 68 tends to press the sleeve 65 outwardly on the shaft 61 away from the switch. The outer face of the hub 66 has radially extending grooves 71 (see Figure 17) into one of which a pin 72 which extends transversely through the outer end of the shaft 61 fits when the sleeve 65 is pressed outwardly on the shaft 61 by the spring 68. Therefore, when the sleeve 65 is in its outer position, rotation of the knob 67 turns the shaft 61 as well as the sleeve 65.

As noted, turning the knob 67 turns the sleeve 65 and this in turn rotates the gear 70 mounted on the end of the sleeve within the casing. The gear 70 meshes with a gear drum 73 secured to the shaft 63. When the knob 67 is turned, therefore, the shaft 63 will also turn. This will have no effect on the tuning strip, however, because, as shown in Figure 14, the shaft 63 and socket 64 are spaced away from the head 30 on the tuning strip. The shaft 63 is held in the outer position just described by the spring 68 which presses against the gear 70. The gear 70 carries a washer 74 which presses against a collar 75 on the gear drum 73. Therefore, the spring 68 holds the shaft 63 in the position shown in Figure 14 in which the socket 64 is spaced away from the head 30 on the tuning strip.

After a particular tuner strip has been step selected by turning the shaft 61 and bringing the tuner strip up into the position shown in Figure 14, tuning of the strip is accomplished by turning the knob 67 to move the dielectric strip 21 relative to the strip 20 and thereby adjust one or more of the components on the tuner strip by rotation of the head 30. However, in order to reach the head 30, an operator must first press the knob 67 in on the shaft 61 towards the multiple position switch. This frees the pin 72 from grooves 71 and, therefore, rotation of the knob 67 turns only the sleeve 65. Pressing the knob 67 and sleeve 65 inwardly towards the switch moves the gear 70 on the inner end of the sleeve to the left (viewing Figure 14) towards the switch. A spring 76 mounted on the shaft 63 between the casing 62 and the collar 75 then moves the shaft 63 to the left so that the socket 64 engages the head 30. The head 30 thus can be turned by an operator by turning the knob 67. Figure 15 shows the relative position of the parts of the mechanism when the socket 64 engages the head 30.

To insure that pressure of the socket 64 against the head 30 does not dislodge a tuning strip while it is being fine tuned, I provide a backing plate 77 which is mounted on the side of the multiple position switch casing in line with the shaft 63 and at the opposite end of the tuning strip.

I also provide a safety device to insure that the shaft 61 has been turned to the position to exactly align a tuning strip with the fixed contacts of the tuner and the shaft 63 before the shaft 63 can be moved toward the strip to engage the head 30. I provide a detent plate 78 on the shaft 61 in a position such that its outer portions pass between the shaft 63 and the head 30. The plate has four openings 79 which are spaced 90° from each other around the axis of the plate. As explained in my said copending application, Serial No. 571,798, now Patent No. 2,813,935, the shaft 61 has to be turned 90° in order to bring successive tuning strips into engagement with the fixed contacts. The plate 78 is positioned on the shaft 61 so that, whenever a tuning strip is connected to the fixed contacts, one of the openings 79 is in line with the shaft 63 and the head 30. The openings 79 are large enough to permit the shaft 63 to pass through them so that the socket 64 can engage the head 30. As can be seen from Figure 14, if the shaft 61 has not been turned to bring a tuning strip into the correct position, a solid portion of the plate 78 will prevent the shaft 63 from extending out to engage the head 30. The importance of this feature is that occasionally in changing from one channel to another an operator will not turn the knob the full amount and, if there is a spring actuated detent to hold the knob in proper position for each channel, the spring actuated detent may "snap" the shaft around to the proper position and thereby damage the tuning strip if at that time the shaft 63 should be extending out into the path of the head 30 on one of the strips.

Another safety device for preventing damage to the tuner strips is provided by the arrangement wherein the socket 64 is moved towards the head 30 only by the force of the spring 76 rather than by direct manual pressure of the operator. If the socket 64 is not in line with the head 30 only the relatively slight pressure of the spring 76 is applied to the head 30, whereas an operator might apply manually sufficient pressure to bend or break off the head 30 and shaft 28 on the strip.

My adjustment mechanism also has a dial 80 to indicate the different channels that are selected. As noted, the shaft 61 must be turned 90° to move from one tuning strip to the next adjacent strip. Obviously, the numbers on the dial 80 corresponding to the channels should be spaced uniformly around the dial and, therefore, I provide a mechanism for gearing down rotation of the dial 80 relative to rotation of the shaft 61. The gear 69 meshes with a gear 81 mounted on a shaft 82 which in turn is mounted in the casing 62. The shaft 82 extends beyond the casing 62 on the side away from the switch and carries a gear 83 on its outer end. As shown in Figure 14, the dial 80 is mounted on a second sleeve 84 which is concentric with the shaft 61 and the sleeve 65 but turns independently of both of these members. The sleeve 84 carries at its inner end nearest the switch a gear 85 which meshes with the gear 83. The shaft 82 carries on each side of the gear 83 a collar 86 which is larger in diameter than the gear 83 and which extends on both sides of the gear 85. As noted, the gear 85 is secured to the sleeve 84 and these collars 86 prevent the sleeve 84 and the dial 80 from moving in and out when an operator moves the sleeve 65 in and out on the shaft 61.

The ratio of the gears 69, 81, 83, and 85 is such that, when the shaft 61 turns 90°, the dial 80 moves 20°. As noted, I prefer to have eighteen tuning strips in my multiple position switch and, therefore, numbers corresponding to the tuning strips can be spaced evenly about the dial 80.

The operation of my frequency adjusting and fine tuning device is as follows. To tune to a very high frequency, the knob 67 is turned to connect the appropriate tuning strip into the main tuner circuitry. If fine tuning is required, the knob 67 is then pressed towards the switch so as to disengage the knob from the shaft 61. This permits the socket 64 on the shaft 63 to engage the head 30 on the individual tuning strip which is connected into the main tuner circuitry. The knob 67 is then turned to make whatever fine tuning adjustments are required. In the case of a very high frequency, this involves adjusting only that coil on the strip which is connected into the oscillator circuit.

If the operator desires to tune to an ultrahigh frequency, the operation is somewhat different from that described with respect to a very high frequency. The circuits on the tuning strips for ultrahigh frequencies are so designed that each strip can be varied over a relatively wide range of frequencies, for example, a range in the order of that corresponding to frequencies assigned to from five to twenty-five ultrahigh frequency channels. Therefore, when an operator is adjusting a television receiver for an ultrahigh frequency station, he will turn the knob 67 to connect into the main tuner circuitry the strip covering the range of frequencies within which the particular desired frequency falls. He will then press in the knob 67 to adjust to the particular frequency. For example, if the frequency corresponding to channel 35 is required, the operator will turn shaft 61 to connect in a tuner strip covering, for example, channels 28 to 55, and then press in the knob 67 and turn the knob to rotate the head 30 and thereby adjust that tuning strip to the desired frequency of channel 35. By this adjustment, the fine tuning of channel 35 is also accomplished automatically and simultaneously.

In Figure 19 of the drawings, I have shown a modified form of combined adjusting and fine tuning mechanism which I have developed. This modified mechanism has a shaft 87 which is used to turn the multiple position switch to select a particular tuner strip, in the same manner as the shaft 61 in the embodiment shown in Figure 14 was used to select a particular strip. The shaft 87 may be turned by a knob 88 mounted on its outer end. I also provide a casing 89 which supports a shaft 90 mounted parallel to the shaft 87. The shaft 90 has a socket 91 which, when the shaft 90 is moved axially to the left (viewing Figure 19), engages the head 30 on a tuning strip. To move the shaft 90 axially to engage the head 30 and to turn the head 30, I provide another hand knob 92 which is mounted on one end of a sleeve 93 which is concentric with and rotates about the shaft 87. The end of the sleeve 93 within the casing 89 carries a gear 94 which meshes with a drum gear 95 carried on the shaft 90. The shaft 90 has a collar 96 on the side of the drum gear 95 which is away from the head 30. The collar 96 is larger in diameter than the drum gear 95 and therefore extends radially beyond one side of the gear 94. When the knob 92 is pressed inwardly towards the switch, the sleeve 93 and gear 94 are moved in the same direction and a spring 97 on the shaft 90 between the casing 89 and the collar 96 moves the shaft 90 to the left (viewing Figure 19). The socket 91 thereby engages the head 30.

Normally, the sleeve 93 and shaft 90 are in their outer position away from the switch, as shown in Figure 19. To keep the shafts in this position, I provide a spring 97a which is mounted on the shaft 87 and extends between a gear 100 on the inner end of the shaft 87 and the gear 94 which presses the gear 94 and sleeve 93 away from the switch. The gear 94 also presses against the collar 96 and, since the spring 97a is stronger than the spring 97, the shaft 90 is also moved away from the switch.

The tuner operating mechanism shown in Figure 19 also has a channel indicating dial 98 which is mounted on a sleeve 99 which rotates on the sleeve 93 but independently of that sleeve. I provide mechanism for turning the dial 98 upon rotation of the knob 88 which is substantially the same in function and operation as similar mechanism in the embodiment shown in Figure 14. Thus, the gear 100 mounted on the end of the shaft 87 which is adjacent the multiple position switch turns with that shaft and in turn rotates a gear 101 mounted on a shaft 102 in the casing 89. The shaft 102 extends beyond the casing and, on its end outside the casing, has a gear 103 which meshes with a gear 104 secured to the sleeve 99. The shaft 102 also has two collars 105 on either side of the gear 103 which are larger in diameter than the gear 103 and therefore extend radially on each side of the gear 104. These collars 105 prevent the sleeve 99 and the dial 98 from moving axially along the shaft 87 when the sleeve 93 is moved along the shaft.

I also provide a detent plate 106 which is the same in structure and operation as the detent plate 78 shown in Figure 18.

From the foregoing, it is obvious that my method and apparatus for tuning a radio frequency have many advantages over mechanism now used in television tuners. In selecting any particular television channel, an operator can bring the particular strip required in contact with the main circuitry and then "fine tune" the strip if it is a very high frequency strip, or locate a new channel on the strip if it is an ultrahigh frequency strip. All this is done without disturbing the main tuner circuitry and thus without disturbing any similar adjustments previously made on the other strips in the tuner.

My inventions are particularly advantageous for television receivers in the ultrahigh frequency range because they provide step tuning in this range for many different groups of different ultrahigh frequency channels, each group being selected by each operator according to the particular channels receivable in his locality. Once the particular channels receivable in a locality are located on the strips provided, the operator can thereafter switch from one pre-set ultrahigh frequency channel to another pre-set channel simply by turning the control knob one step-position at a time. He thus obtains step tuning in the ultrahigh frequency range for all of the receivable channels in his locality.

Moreover, when any strip is tuned to a particular ultrahigh frequency channel, it is also "fine tuned" to that channel and, since each tuner strip is adjusted independently of the other strips, the operator does not have to fine tune the receiver each time he changes the set to receive a different channel, which is necessary in ultrahigh frequency continuous tuning and also in all known designs of ultrahigh frequency step tuning.

A tuner embodying my inventions has the flexibility of adjustment of a continuous tuner without losing the desirable feature of step tuning. Thus, if a television receiver embodying my inventions is moved from a locality having certain ultrahigh frequency channels assigned to it to another locality having different ultrahigh frequency channels assigned to it, the owner of the set can adjust a tuner strip to each of the new channels in the new locality. Likewise, if a new channel is assigned to any particular locality or if the frequency of a channel is changed, the owner can make appropriate adjustments on one of the ultrahigh frequency tuner strips in the tuner.

Moreover, all of the adjustments of which my tuner is capable can readily be made by the owner of a television receiver from outside the set. It is not necessary to have a serviceman replace tuner strips or disassemble the receiver and the tuner in order to adjust the individual tuner strips.

My inventions make possible a compact tuner covering all very high frequency channels and a sufficient number of ultrahigh frequency channels to meet the requirements of any locality where a receiver using my tuner may be located. For example, I can provide an 18 position tuner in which there are 12 positions for very high frequency channels and 6 positions for ultrahigh frequency channels. The ultrahigh frequency strips may be arranged in any number of different combinations. Further illustrating the example, I can provide three tuning strips which will cover the frequency range of channels 14 to 34, inclusive, two strips covering the range of frequencies from channels 28 to 55, inclusive, and one strip covering the range of channels 50 to 83, inclusive. This arrangement is based on the fact that more frequencies have been assigned in the lower frequency range, due to better reception, than in the high frequency range. The arrangement, of course, can be varied as desired by the manufacturer.

While I have described certain presently preferred embodiments of my inventions, it is to be understood that they may be otherwise embodied within the scope of the appended claims.

I claim:

1. In a tuner for a receiver of radio frequencies, said tuner having movable sets of components which are adapted to be connected one set at a time into the main tuner circuitry to adjust the tuner, the main tuner circuitry having fixed contacts adapted to receive contacts on each movable set of components, the sets of components being mounted at spaced intervals on a support movable on a rotatable axis, improved mechanism for adjusting the tuner comprising a shaft operatively connectable to said axis to bring the contacts of successive sets of components into electrical engagement with said fixed contacts, and a second shaft operatively connectable to at least one of the components of a set of components to adjust said component when said set is connected to the main tuner circuitry, a concentric sleeve slidably mounted on said first shaft, a pinion mounted on said sleeve, a second pinion meshing with the first pinon and operatively connected to said second shaft, a turning knob mounted on the concentric sleeve, means for operatively connecting and disconnecting said knob and said first shaft, said second shaft being axially movable to engage and disengage it from one of said adjustable components, means resiliently urging said second shaft out of engagement with said component, and means resiliently urging said second shaft into engagement with said component when the concentric sleeve is moved along said first shaft in the direction of the component.

2. In a tuner for a receiver of radio frequencies, said tuner having movable sets of components which are adapted to be connected one set at a time into the main tuner circuitry to adjust the tuner, the main tuner circuitry having fixed contacts adapted to receive contacts on each movable set of components, the sets of components being mounted at spaced intervals on a support movable on a rotatable axle, the improvement comprising a shaft on which said support is mounted to bring the contacts of successive sets of components into electrical engagement with said fixed contacts, and a second shaft operatively connectable to at least one of the components of a set of components to adjust said component when said set is connected to the main tuner circuitry, a concentric sleeve slidably mounted on said first shaft, a pinion mounted on said sleeve, a second pinion meshing with the first pinion and operatively connected to said second shaft, a turning knob mounted on the concentric sleeve, said second shaft being axially movable to engage and disengage it from one of said adjustable components, means resiliently urging said second shaft out of engagement with said component, and means resiliently urging said second shaft into engagement with said component when the concentric sleeve is moved along said first shaft in the direction of the component.

3. Mechanism for adjusting a tuner for a receiver of radio frequencies, said tuner having movable sets of components which are adapted to be connected one set at a time into the main tuner circuitry to adjust the tuner, the main tuner circuitry having fixed contacts adapted to receive contacts on each movable set of components, the sets of components being mounted at spaced intervals on a support movable past the fixed contacts, said mechanism comprising a rotatable shaft connected to said support to move the support upon rotation of the shaft and bring the contacts of successive sets of components into electrical engagement with said fixed contacts, a second shaft slidably mounted for axial movement towards and away from a set of components which is connected to the main tuner circuitry to engage and disengage at least one of the components of each set of components when each set is connected to the main tuner circuitry, said second shaft also being mounted for rotation whereby rotation of the shaft when it engages said component adjusts the component, a hand knob for axially moving said second shaft and rotating both the first and second shafts, and means operatively connecting said knob to the first shaft whereby on axial movement of the second shart towards a set of components connected to the main tuner circuitry the knob is disengaged from the first shaft.

4. Mechanism for adjusting a tuner for a receiver of radio frequencies, said tuner having movable sets of components which are adapted to be connected one set at a time into the main tuner circuitry to adjust the tuner, the main tuner circuitry having fixed contacts adapted to receive contacts on each movable set of components, the sets of components being mounted at spaced intervals on a support movable past the fixed contacts, said mechanism comprising a rotatable and axially movable socket positioned adjacent but spaced from the set of components in electrical engagement with the fixed contacts, said socket being axially movable towards said set of components to engage at least one of said components and rotatable to adjust the components with which it is engaged, a spring operatively engaging the socket for resiliently pressing the socket towards engagement with said components, and a second spring operatively engaging the socket stronger than said first spring for pressing the socket out of engagement with said components, said second spring maintaining the socket out of engagement with said set of components, and means for manually moving the socket towards said set of components by compressing said second spring to permit said first spring to resiliently press said socket against said set of components.

5. Mechanism for adjusting a tuner for a receiver of radio frequencies, said tuner having movable sets of components which are adapted to be connected, one set at a time, into the main tuner circuitry to adjust the tuner, the main tuner circuitry having fixed contacts adapted to receive contacts on each movable set of components, the sets of components being mounted at spaced intervals on a support movable past the fixed contacts, said mechanism comprising rotatable component engaging means positioned adjacent but spaced from the set of components in electrical engagement with the fixed contacts, said component engaging means being movable towards said set of components to engage at least one of said components and rotatable to adjust the components with which it is engaged, a spring operatively connected to said component engaging means for resiliently pressing the same towards engagement with said components, and a second spring operatively connected to said component engaging means for resiliently pressing the same out of engagement with said components, said second spring being stronger than said first spring and maintaining said component engaging means out of engagement with said set of components, and means for manually moving said component engaging means toward said set of components by compressing said second spring to permit said first spring to resiliently press said component engaging means against said set of components.

References Cited in the file of this patent

UNITED STATES PATENTS

| | | |
|---|---|---|
| 1,837,678 | Ryder | Dec. 22, 1931 |
| 2,014,524 | Franz | Sept. 17, 1935 |
| 2,078,908 | Harrison | Apr. 27, 1937 |
| 2,078,909 | Gunther | Apr. 27, 1937 |
| 2,475,637 | Vladimir | July 12, 1949 |
| 2,476,930 | Towle | July 19, 1949 |
| 2,545,681 | Zepp | Mar. 20, 1951 |
| 2,600,119 | Lazzery | June 10, 1952 |
| 2,601,338 | Snyder | June 24, 1952 |
| 2,762,987 | Mackey | Dec. 11, 1956 |
| 2,773,989 | Nestlerode | Dec. 11, 1956 |
| 2,786,142 | Tyminski | Mar. 19, 1957 |
| 2,808,515 | Nestlerode | Oct. 1, 1957 |

FOREIGN PATENTS

| | | |
|---|---|---|
| 684,041 | Great Britain | Dec. 10, 1952 |

UNITED STATES PATENT OFFICE

CERTIFICATION OF CORRECTION

Patent No. 2,979,615 April 11, 1961

Mogens W. Bang

It is hereby certified that error appears in the above numbered patent requiring correction and that the said Letters Patent should read as corrected below.

Column 2, line 35, for "dealers" read -- dealer --; column 4, line 68, for "liens" read -- lines --; column 10, line 65, for "axle" read -- axis --; column 11, line 31, for "shart" read -- shaft --.

Signed and sealed this 29th day of August 1961.

(SEAL)
Attest:

ERNEST W. SWIDER
Attesting Officer

DAVID L. LADD
Commissioner of Patents